United States Patent Office 3,216,770
Patented Nov. 9, 1965

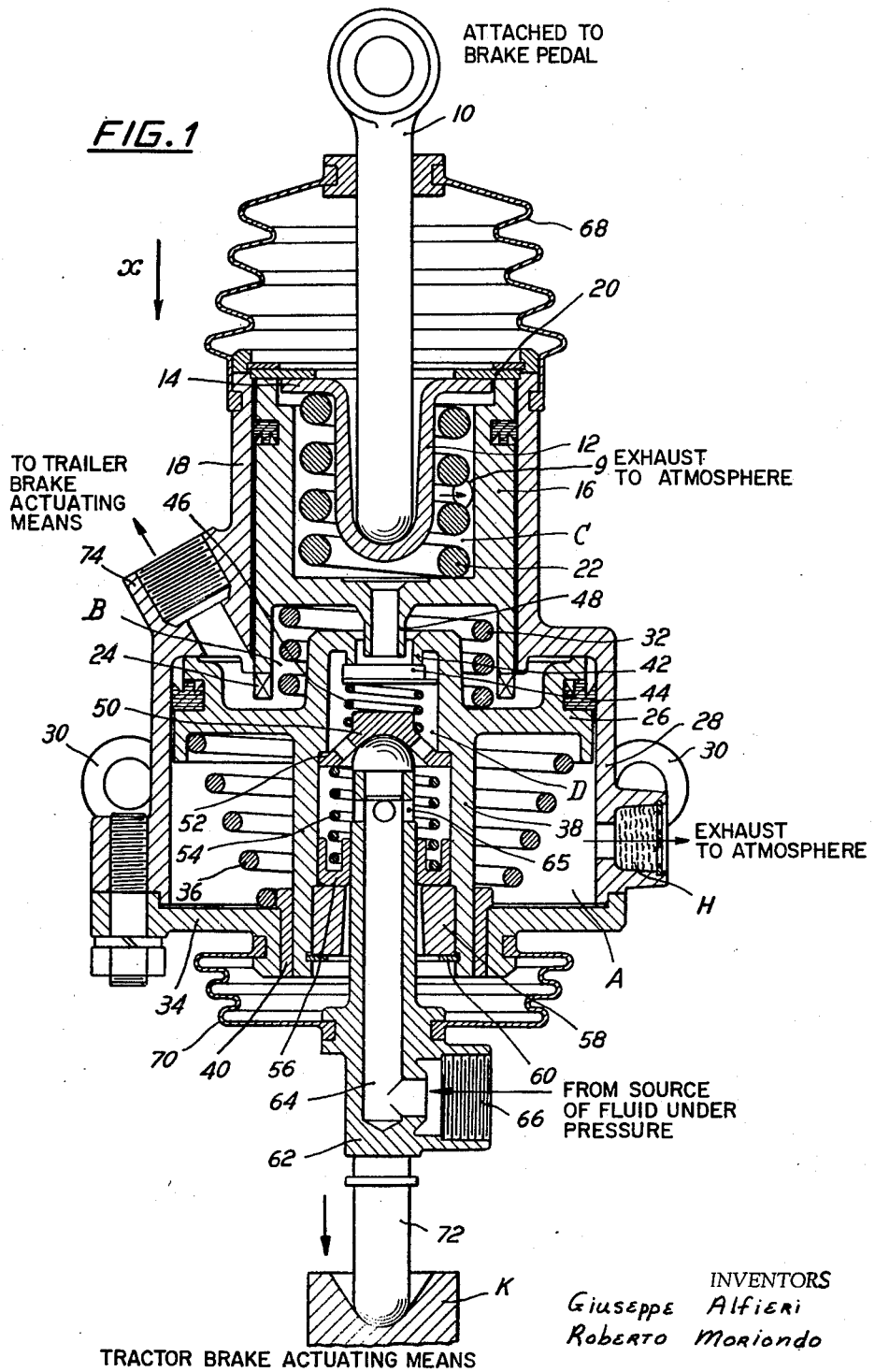

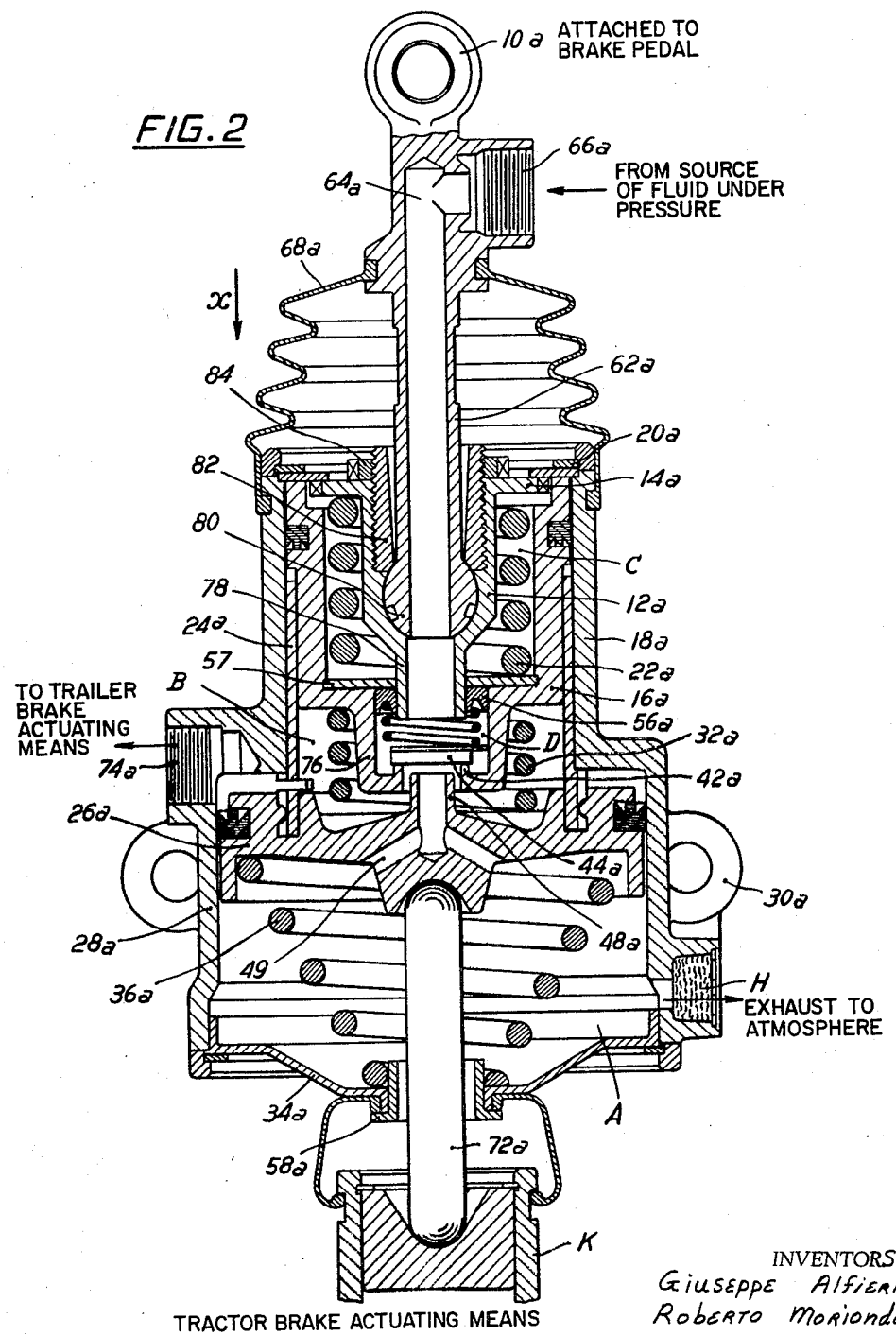

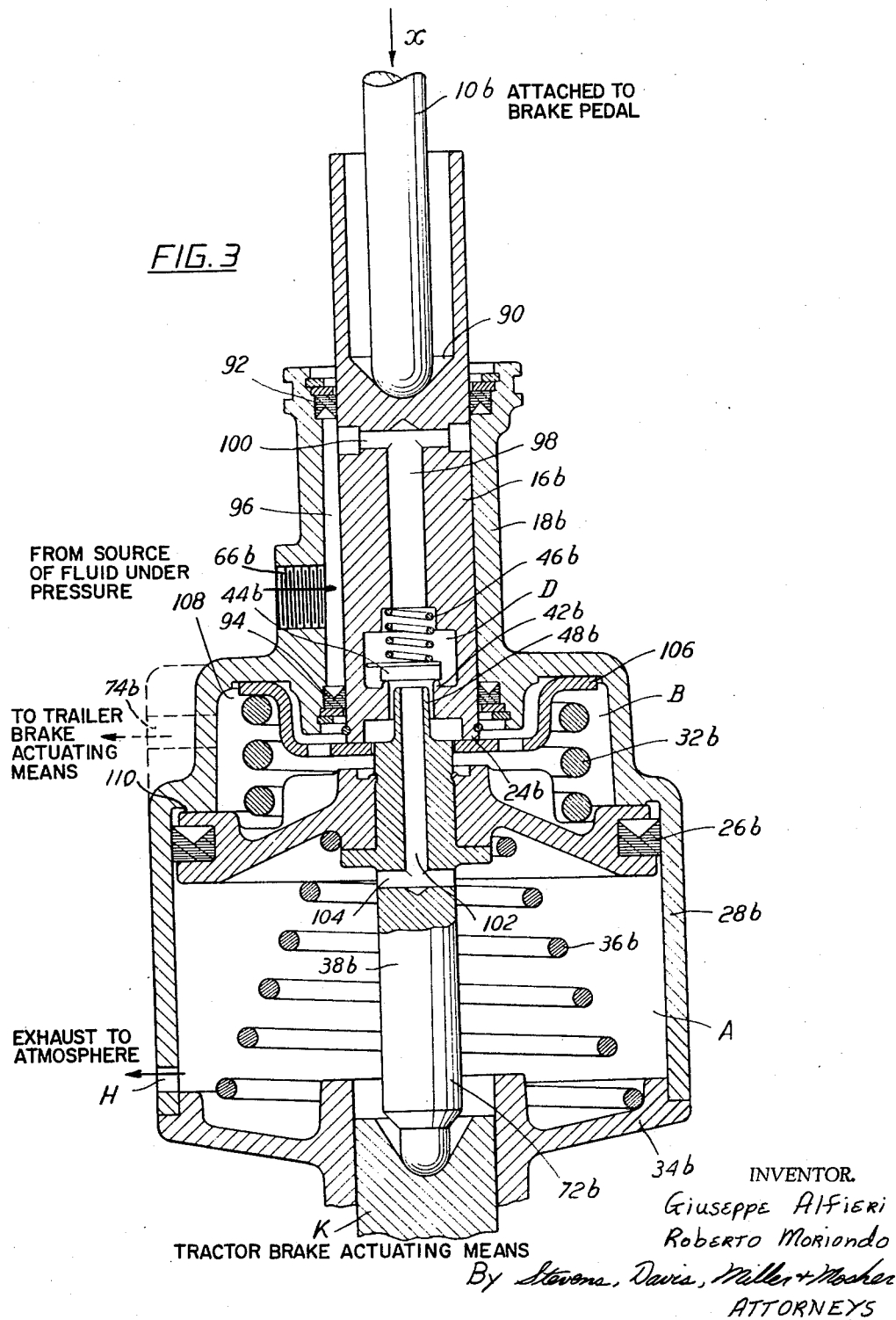

3,216,770
SERVO-CONTROL FOR FLUID PRESSURE BRAKING APPARATUS OF MOTOR VEHICLES WITH TRAILER
Giuseppe Alfieri and Roberto Moriondo, Milan, Italy, assignors to Fabbrica Italiana Magneti Marelli S.p.A., Milan, Italy, a corporation of Italy
Filed July 16, 1963, Ser. No. 295,369
Claims priority, application Italy, Sept. 15, 1962, 27,188; Feb. 4, 1963, 31,528
4 Claims. (Cl. 303—6)

The invention relates to a servo-control to actuate the devices which feed a pressurized fluid to the control members actuating the braking apparatus of a motor vehicle having one or more trailers.

An object of the invention is to provide a servo-control for braking apparatus of motor vehicles, particularly for pneumatic brakes, the braking of the vehicles by the known standard and so that the braking occurs firstly on the trailer and then on the tractor vehicle. Another object of the invention is to enable the breaking of the vehicles, also when the servo-control has undergone failures or breakdowns, as such servo-control can constitute a member of a kinematic linkage connecting the manual control member, such as a foot lever or the like, to the feed control member of the tractor brakes, thus ensuring, at any time and in case of an emergency, the partial braking of the vehicle.

Another object of the invention is to advance or delay the servo-control action with respect to the physical action as exerted by the driver, and in order to carry out three differentiated braking steps. More specifically, the first step or initial braking (that is, the braking as generally and frequently carried out by the driver according to conventional rules) is controlled and felt by the driver up to a determined braking intensity, beyond which the second braking step occurs, when braking is carried out, exclusively by the servo-control under the driver's control, and thereafter the third step occurs, during which the braking is performed at the same time both by the servo-control and by physical action of the driver, so as to obtain a quick and powerful braking action as required in case of emergency.

The first step, during which the initial braking is under the whole and immediate control of the driver, affords considerable advantages, at it—being gradually and easily felt by the driver—can be used in particularly braking apparatuses, such as those having drum brakes with surrounding braking shoes.

Furthermore the present invention enables braking of a vehicle train as constituted by a tractor and its trailer or trailers with the necessary standard of safety, and particularly so that braking occurs firstly on the towed vehicles and then on the tractor vehicle.

The servo-control according to the invention can be interlinked between the manual control member, such as a foot brake pedal or the like, and the means controlling the feeding to the fluid pressure members actuating the brakes as associated with the tractor vehicle and the trailer, so that the brakes of such trailer are operated in advance with respect to the brakes of the tractor vehicle and is characterized by a first cylinder-piston unit, whose mobile part is under the control of resilient means on one side, and of the pressure fluid sent to the actuating members of the trailer brakes and in operative connection with the members actuating the brakes of the tractor on the other side; characterized by a second cylinder-piston unit, whose mobile part connects with the manual means for the control thereof and with the mobile part of said first cylinder-piston unit by suitable resilient means, and characterized by commutable valve members under the control of the sliding part of said second cylinder-piston unit, in order to control the communication between said brake-actuating members of the trailer and the discharge or the source of pressurized fluid.

A preferred embodiment of the servo-control of this invention comprises a first cylinder and a second cylinder, coaxial to each other, realized so as to constitute a single element provided with means for securing it, while the corresponding pistons provide members for the operative connection with one another and define together with such cylinder three chambers which communicate: the outer ones with the atmosphere and the middle one with said members actuating the trailer brakes; one of such pistons comprising the commutable valve members, and the other one comprising a bored push rod that can be engaged with such valve members.

In a further embodiment of the servo-control, the same comprises a second cylinder-piston unit coaxial with the servo-control cylinder-piston unit and one of the two chambers is in pneumatic connection with the pressure chamber of said servo-control cylinder-piston unit; means to connect the mobile part of said second cylinder-piston unit to the manual actuating means; resilient means interposed between the adjacent ends of the mobile parts of both cylinder-piston unit and whose action applies to the movable part of the servo-control unit, in the same direction as that one of the compressed air, so that the admission of compressed air into the common chamber of both cylinder-piston units besides actuating the considered braking member, exerts on the movable member of said second cylinder-piston unit such a reaction as to signal to the driver the existence of the braking force. In order to effect an advanced or delayed control action, with respect to the manual operation of the driver, the servo-control, according to the invention, provides that the two resilient means, as interposed between the movable parts of the two cylinder-piston units, have a deformation load lower or greater than the load of the other resilient means of the servo-control cylinder-piston unit, so that the action of the servo-control with respect to the driver's action is either delayed or advanced.

The invention will now be explained by the following specification, with reference to the accompanying drawings illustrating, by way of example, only three embodiments of the servo-control.

FIGURES 1 to 3 are axial sections of the servo-control.

With reference to FIGURE 1, the servo-control provides a control rod 10, that can be connected in a known manner, to the manual actuating member, such as a brake pedal, and which cooperates through its other end with a cup 12, provided with a turned over edge 14, cooperating with a shoulder provided at one of the ends with a hollow piston 16, sliding in an associated cylinder 18 and held by an elastic ring 20, engaged in a groove of the border of cylinder 18.

The edge 14 of the cup 12 retains also one of the edges of a spiral spring 22, whose other end engages with the bottom of piston 16. The piston 16 provides at its other end a slotted crown 24, which can engage, in the manner hereinafter described, with the face of a second piston 26 sliding in an associated cylinder 28 coaxial and integral with said cylinder 18. This body constituted by the two cylinders 18 and 28 has in a suitable position, bored lugs 30, to secure the servo-control to the vehicle frame.

Between pistons 16 and 26 is interposed a spiral spring 32, whose action takes place so as to press said piston 16 against the elastic ring 20.

Cylinder 28 is closed at its other end by a cover 34 holding one of the ends of a conical spiral spring 36, whose other end engages with piston 26 in order to urge it against a shoulder formed by the different diameters of cylinders 18 and 28.

Spring 36 is suitably pre-loaded and the action thereof overcomes the action of spring 32. On the contrary, the action of the (usually not pre-loaded) spring 22 overcomes during the operation the action of the two springs 32 and 36, thus constituting a regulating spring.

Piston 26 is provided then with a bored rod 38, protruding from cover 34 through the bushings 40, and which at its other end is suitably shaped so as to constitute a sealing seat 42 for a disc valve 44 located inside of such piston rod and which is urged against such seat by the action of an associated spring 46.

Valve 44 can engage the end of a bored push rod 48 integral with the bottom of piston 16 and which passes through the sealing seat 42 with a certain play so as to define, between those two parts, an annular gap.

Spring 46 is held at its other end by a bored disc 50, arranged inside of the bored piston rod 38 and which is pushed against an abutment 52 of said rod by a spring 54 arranged between said disc and a lip seal 56 so that this latter is urged against a bush 58 held by a resilient ring 60 engaging with a groove provided at the end of the bored rod 38.

The bored disc 50 has a hemispherical recess, to hold the corresponding end of a rod 62 with an axial bore 64 through the packing 56, connecting, through radial holes 65, to the inside of the piston rod, while at the other end such rod ends with a pipe fitting 66.

Rods 10 and 62 provide, at their ends, grooved collars for holding one of the ends of an associated elastic cover 68 and respectively 70, protecting the outer parts of such rods. Rod 62 terminates at its outer end with a semi-spherical projection 72, engaging with the movable part of an actuating member K and which can be constituted, by way of example, by a conventional pump or distributor, in order to send, in a known manner, a pressurized fluid to the cylinders actuating the brakes of the tractor vehicle.

A pipe fitting 74 connects the servo-control to the servo-distributor associated with the brakes of the trailer, i.e., with the pipe fitting for the governable pneumatic braking of such towed vehicle, through the coupling joint.

The chambers, as defined by the two cylinder-piston units 16–18 and 26–28, connect to each other, by fluid pressure action, in the following way. Chamber A, as defined between piston 26 and cover 34 of cylinder 28, is in permanent communication with the atmosphere through a filter H.

Chamber B, as defined between pistons 16 and 26, is in permanent communication with the pipe fitting 74 and, through push rod 48, such chamber communicates with chamber C, defined by piston 16 and cup 12.

This chamber C is in permanent communication with the atmosphere through an opening 9. Chamber D, defined inside of the bored rod 38 and by the valve 44, communicates, through such valve, with the previously considered chamber B and through bore 64 of rod 62 communicates with the pipe fitting 66 and therefore with the compressed air reservoir, mounted on the vehicle.

After this statement, the normal and emergency operation of the considered servo-control is as follows:

The normal operation of such servo-control is carried out in a known manner, by acting on the vehicle brake pedal, which causes displacement of piston 16 in the direction of arrow X until push rod 48 is engaged with valve 44. The communication of the pipe fitting 74 with the atmosphere is thus interrupted, while, by carrying on the further displacement of piston 16, valve 44 is raised from seat 42 thus establishing the communication between chambers B and D, i.e., between pipe fittings 66 and 74 and the compressed air actuates, in a known manner, the trailer brakes.

The compressed air contained in chamber B actuates also piston 26, which, however, is hindered in its displacement in the direction of arrow X by the action of spring 36 which, as said before, is suitably pre-loaded When pressure in chamber B reaches a pre-determined value, such piston, overcoming the action of spring 36 and through its bored rod 38, displaces rod 62, which acts with its end 72 on the member K, controlling the feeding to the brakes of the tractor vehicle, which is thus braked after the braking of the trailer. It is evident that displacement of piston 26 causes the re-engagement of valve 44 with seat 42, and the following and further displacement of piston 16 restores the initial conditions, so that a gradual braking action takes place and the braking of the trailer is always in advance of the tractor braking.

When discontinuing the action of the brake pedal, then springs 32 and 36 bring back pistons 16 and 26 to their initial positions, push rod 48 is disengaged from valve 44 and this valve closes the communication between chambers B and D, while the push rod establishes the communication of such chamber B with the atmosphere, whereby the brakes of the trailer are deactivated.

In the case of an emergency braking, i.e., when it is not possible, for any reason, to send compressed air to the brakes of the trailer, then displacement of rod 10 in the direction of the arrow X displaces piston 16 and such displacement, in opposition to the action of spring 32, goes on until the engagement of the slotted rim 24 of such piston with piston 26 takes place. A further displacement of rod 10 displaces consequently pistons 16 and 26 and rod 62, actuating, as said before, the brakes of the tractor vehicle. It is to be understood that in this latter case only the physical braking action occurs as carried out by the driver on the brake pedal, while in the former case the compressed air sent to chamber B acts on piston 26, which thus constitutes the servo-control of the braking member of the tractor vehicle.

In the embodiment according to FIGURE 2, like or parts similar to those of FIGURE 1 are idicated by the same reference numerals provided with the literal index $a$.

As is easily pointed out from this FIGURE 2, the illustrated servo-control comprises also a piston $16a$ sliding in an associated cylinder $18a$, with which is integral and coaxial the other cylinder $28a$, in which slides piston $26a$.

The commutable valve member as constituted by the valve $44a$ and associated seat $42a$, is in this embodiment incorporated in piston $16a$ which has at its bottom a hollow projection 76 provided with a bore, whose edge forms the sealing seat $42a$ for said valve $44a$. A free motion of a push rod $48a$ takes place through such bore, said push rod $48a$ being integral with piston $26a$ and communicating, through holes 49, with chamber A in communication with the atmosphere through an opening provided with filter H.

Chamber D, formed by the hollow projection 76, is closed by an annular packing $56a$, held by a bottom plate 57, integral with a tubular projection 78 provided at the bottom of the cup $12a$, this bottom plate being held engaged with the bottom of piston $16a$ by the regulation spring $22a$.

The bottom of the cup $12a$ has a semi-spherical seat to accommodate a spherical head 80 provided at the end of the tubular rod $62a$ and which is held therein by a threaded ring nut 82 engaged with said cup and secured therein by a counter-ring nut 84.

The bored rod 62 ends with a pipe fitting $66a$ and with an eyelet $10a$, this latter being connected in a suitable manner with the actuating brake pedal, while the pipe fitting $66a$ connects to the compressed air reservoir mounted on the vehicle.

The operation of the servo-control according to this embodiment is like that of the servo-control according to FIGURE 1 and therefore its description is omitted.

The servo-control illustrated in FIGURE 3 is like that shown in FIGURES 1 and 2 and has a control rod $10b$ which engages in a housing 90 provided at one of the ends of piston $16b$, sliding in an associated cylinder $18b$, by means of packings 92 and 94. The inner wall of cylinder $18b$ has along one of its generating lines, a groove 96, in which comes out the end of the fitting $66b$ leading to the source of compressed air, not illustrated. Piston 16b has an axial bore 98 communicating, through radial parts 100, with said groove 96, in order to establish in this manner a permanent communication between pipe fitting 66b and a chamber D, as defined inside of such piston and at the end thereof. The bottom of such chamber is provided with holes and constitutes the seat 42b for a cut-off valve 44b urged against such seat by the action of a spring 46b.

Cylinder 18b is integral and coaxial with the cylinder-piston of the servo-control and which comprises a second cylinder 28b, wherein a second piston 26b slides under the control of a conical spiral spring 36b, held by a cover 34b, closing cylinder 28b.

In this embodiment the rod 38b of piston 26b has an axial bore 102 connected to radial parts 104. The end of such piston rod is inserted, with a certain play, into an opening provided by the bottom of chamber D, so as to form a push rod 48b to act on previously considered valve 42b.

A sliding insertion of dish 106 is provided on the protruding portion of piston rod 38b and holds one of the ends of a spring 32b, whose other end engages with piston 26b. The action of this spring holds in the dish 106 pressed against a shoulder 108 formed between cylinders 18b and 28b. In its turn, piston 26b is pressed by a spring 36b against a shoulder 110 provided at the end of cylinder 28b. Piston 16b normally abuts with its edge 24b against the dish 106, which is urged by spring 32b against the shoulder 108. The spiral spring 32b can be constituted by a flat spring or by a resilient non-metallic material, such as rubber or the like.

Chamber B as defined by pistons 16b and 26b and by the associated cylinders, can be connected, through a pipe fitting 74b, to the servo-distributor of the braking plant of a vehicle towed by the tractor vehicle, whose braking plant comprises, as said before, the servo-distributor under consideration. The radial parts 104 of piston rod 38b come out in a chamber A, which is either in immediate communication with the atmosphere, or communicates with it through an opening provided at the filter H. Piston rod 38b ends with a semi-spherical projection 72b, which engages, as said before, with the movable operating member K, to actuate, in a known manner, the braking means of the considered vehicle.

The operation of the servo-brake under consideration is like that already described and, assuming that the action exerted by the spring 36b overcomes the action of spring 32b, then three braking conditions take place in succession.

In the first case the driver, by acting on the control rod 10b, displaces in the direction of arrow X piston 16b and the edge 24b thereof by means of dish 106, acts on spring 32b and, against the action of spring 36b, displaces piston 26b and its piston 38b in the direction of arrow X to actuate the movable member K and hence the vericle brakes. This actuation takes place before the push rod 48b engages and opens valve 44b, and thus the advanced braking of the vehicle is obtained. Successively takes place the second braking condition, and the further displacement of rod 10b causes the deformation of spring 32b, whereby occurs the engagement of push rod 48b with valve 44b and the opening thereof. The compressed air coming from the pipe fitting 66b and contained in chamber D, passes into chamber B and acts on piston 26b, which thus carries out its servo-control action, and the movable member K is further displaced to increase further the braking action. Pressure which establishes in chamber B, besides being transmitted to piston 26b, is transmitted also to piston 16b to exert on the latter a push in a direction opposite to that of arrow X, and which is proportional to the pressure existing in said chamber B. This push as exerted on piston 16b constitutes a reaction in opposition to the displacement action exerted by the driver on the control rod 10b. It follows that the driver, during the braking, feels the intensity of such braking since the physical effort as exerted by him on the rod 10b is opposed proportionately by the pressure of the compressed air on piston 16b, and such physical effort, through the spring 32b, is applied to piston 26b.

When the pressures in chambers B and D are equal, the possible further actuation of the control rod 10b establishes the third braking condition. In fact, the further load applied to the spring 32b causes at a given time, the dish 106 to abut to the hub of piston 26b, and so a further increase of the push exerted on piston 26b takes place, and consequently a further displacement of the member K, thus carrying out a very strong braking action, as required, for instance, in an emergency case.

When the driver removes or reduces the pressure exerted on the rod 10b, first of all the relieving of the mechanical push exerted on piston 26b takes place, and then occurs a gradual elimination of the pneumatic pressure as established in chamber B, since the push rod 48b, by disengaging from valve 44b, enables the closing of such valve and successively the bore 102 of the push rod puts in communication chamber B with the atmosphere through chamber A and opening of filter H.

When the action exerted by the spring 32b overcomes the action of the spring 36b, then two braking conditions takes place, i.e., first the actuation of the control rod 10b causes the initial compression of spring 32b and successively cut off valve 44b opens in the considered manner, with consequent actuation of the movable member K. The second braking condition is like the third one as previously considered, and therefore it will not be described.

It is to be understood that alteration of the features of one or both springs 32b and 36b will cause a suitable alteration of the brake control with respect to the servo-control actuation.

When, for any reason, there is not air in the pipe fitting 66b, then the servo-control can actuate all the same the movable member K, as the displacement of piston 16b displaces first piston 26b and such displacement, through the dish 106, is transmitted to the piston rod 38b and therefore to the already considered member K.

With reference to what is said above, it is evident that the braking of the vehicle can be effected in three steps, in the first step occurring the immediate control of the member K. In the second step the member K is actuated by the servo-control, and in the third step finally member K is operated either through a direct mechanical action, or also through a servo-control action. By modifying springs 32b and 36b, in the first step the member K is actuated through a servo-control action, since valve 44b opens before performing motion of piston 26b. This latter condition is advantageous in the case that the servo-control actuates, in addition to the brakes of the tractor vehicle, also the brakes of a towed vehicle, said brakes being fed through ducts leading to the pipe fitting 74b as previously considered.

It is obvious that in the described and illustrated servo-control many changes and modifications may be made with respect to the characteristics of use and application. By way of example, such servo-control can be associated with or embodied in a braking distributor or also combined with a brake actuating member of the tractor vehicle, particularly when such member is of the hydraulic type. Such changes and modifications can be performed without departing from the spirit and scope of the invention.

We claim:

1. A servo-control for motor vehicles having a tractor vehicle and at least one trailer, said servo-control being mounted between a brake pedal in said tractor and brake actuating means for actuating brakes in said tractor and said trailer, said servo-control comprising a first and second cylinder coaxial and contiguous to each other, a first and second piston mounted within said first and second cylinder respectively, said first piston and the outer end of said first cylinder defining a first chamber, said pistons defining the ends of a second chamber, said second piston and the outer end of said second cylinder defining a third chamber, a first resilient means mounted between said pistons biasing them away from each other, a second resilient means normally biasing said first piston towards said second cylinder, means mechanically connecting said first piston to a tractor brake actuating means, hollow push rod means mounted on said first piston depending towards said second piston, said push rod means defining a bore through said first piston, a normally biased closed commutable valve means mounted in said second piston, a tubular rod in mechanical connection with said brake pedal and said second piston, said tubular rod being in pneumatic connection on one side with a source of fluid under pressure and on the other side to said commutable valve, said second chamber being connected to a trailer brake actuating means, whereby depression of said brake pedal and moving said first piston to actuate said tractor braking means.

2. A servo control for motor vehicles having a tractor vehicle and at least one trailer, said servo control being interconnected between a brake actuating member and means controlling the supply of fluid to brake actuating means of said tractor vehicle and said trailer, said braking means on said trailer being actuated in advance with respect to the braking means of said tractor vehicle, said servo control comprising first and second cylinders, coaxial and contiguous with each other, first and second pistons movably mounted within said first and second cylinders, respectively, a first chamber defined by the outer end of said first cylinder and said first piston, a second chamber defined between said first and second pistons, a third chamber being defined by the outer end of said second cylinder and said second piston, said first and third chambers being in communication with the atmosphere, said second chamber being in communication with said trailer brake actuating means, first resilient means disposed between one end of said first cylinder and one side of said first piston for biasing said piston towards an abutment between said first and second cylinders, a second resilient means disposed between said first and second pistons, first shaft means mechanically connecting said first piston to said tractor brake actuating means, second shaft means operatively connecting said second piston to said brake actuating member, means connecting said second chamber through one of said pistons to the atmosphere under no braking conditions, communicable valve means within at least one of said pistons, said valve means being actuated relatively by at least one of said shaft means and connecting said trailer brake actuating means to a source of pressurized fluid while closing off the said exhaust means under braking conditions, at least one of said shaft means being a hollow push rod for mechanically contacting at least one of said pistons and hydraulically connecting said adjustable fluid pressure chamber to a source of pressure, whereby depression of said brake applying means causes actuation of said trailer braking means and tractor braking means respectively in sequence.

3. A servo control for motor vehicles having a tractor vehicle and at least one trailer, said servo control being interconnected between a brake actuating member and means controlling the supply of fluid to brake actuating means of said tractor vehicle and said trailer, said braking means on said trailer being actuated in advance with respect to the braking means of said tractor vehicle, said servo control comprising first and second cylinders, coaxial and contiguous with each other, first and second pistons movably mounted within said first and second cylinders, respectively, a first chamber defined by the outer end of said first cylinder and said first piston, a second chamber defined between said first and second pistons, a third chamber being defined by the outer end of said second cylinder and said second piston, said first and third chambers being in communication with the atmosphere, said second chamber being in communication with said trailer brake actuating means, resilient means disposed between one end of said first cylinder and one side of said first piston for biasing said piston towards an abutment between said cylinders, a second resilient means disposed between said first and second pistons, first shaft means mechanically connecting said first piston to said tractor brake actuating means, second shaft means operatively connecting said second piston to said brake actuating member, said first piston having push rod depending toward said second piston, said push rod being hollow defining a bore through said first piston, a hollow projection in said second piston, a commutable valve member mounted in said hollow projection, a tubular rod in mechanical connection with said servo-control actuating means and in pneumatic connection on one side with said commutable valve and the other side with a source of fluid under pressure, and a tubular piece interposed between said pistons whereby after a predetermined movement of one piston said tubular piece will contact the other of said pistons thereby mechanically moving said other piston.

4. A servo-control according to claim 2 wherein said first shaft is a hollow piston rod attached to said first piston, said shaft accommodating in its inner space the commutable valve members, a tubular rod attached to said first shaft and mechanically contacting said tractor brake actuating means.

References Cited by the Examiner
UNITED STATES PATENTS

| | | | |
|---|---|---|---|
| 2,657,701 | 11/53 | Hupp. | |
| 3,023,053 | 2/62 | Hager | 303—7 |
| 3,047,341 | 7/62 | Alfieri | 303—2 X |

FOREIGN PATENTS 822,490   11/51   Germany.

FERGUS S. MIDDLETON, *Primary Examiner.*